US010843752B2

(12) United States Patent
Sawhill et al.

(10) Patent No.: US 10,843,752 B2
(45) Date of Patent: Nov. 24, 2020

(54) INTEGRATED BICYCLE RACK AND LOCK STATION

(71) Applicant: David Lee Sawhill, Philadelphia, PA (US)

(72) Inventors: David Lee Sawhill, Philadelphia, PA (US); Lucas Taylor, Philadelphia, PA (US)

(73) Assignee: David Lee Sawhill, Philadelphia, PA (US)

( * ) Notice: Subject to any disclaimer, the term of this patent is extended or adjusted under 35 U.S.C. 154(b) by 0 days.

(21) Appl. No.: 16/355,957

(22) Filed: Mar. 18, 2019

(65) Prior Publication Data

US 2019/0344850 A1    Nov. 14, 2019

Related U.S. Application Data

(60) Provisional application No. 62/671,384, filed on May 14, 2018.

(51) Int. Cl.
*B62H 5/00* (2006.01)
*B62H 3/10* (2006.01)
*B62H 3/04* (2006.01)

(52) U.S. Cl.
CPC ............... *B62H 5/005* (2013.01); *B62H 3/04* (2013.01); *B62H 3/10* (2013.01)

(58) Field of Classification Search
CPC . B62H 5/005; B62H 3/04; B62H 3/06; B62H 3/08; B62H 3/10
See application file for complete search history.

(56) References Cited

U.S. PATENT DOCUMENTS

| 542,096 | A | * | 7/1895 | Mumford | ................ | B62H 3/04 |
| | | | | | | 217/37 |
| 3,734,272 | A | * | 5/1973 | Galen | .................... | B65D 85/68 |
| | | | | | | 206/335 |
| 3,783,659 | A | | 1/1974 | Rossi | | |
| 3,815,721 | A | | 6/1974 | Montoya et al. | | |
| 3,865,245 | A | | 2/1975 | Lieb et al. | | |
| 3,887,075 | A | | 6/1975 | Harvey | | |
| 3,934,436 | A | | 1/1976 | Candlin et al. | | |
| 3,964,610 | A | | 6/1976 | Deiner | | |
| 3,970,197 | A | * | 7/1976 | Bale, Jr. | .................... | B62H 3/10 |
| | | | | | | 211/5 |
| 3,996,704 | A | * | 12/1976 | Huey | ...................... | E04H 6/005 |
| | | | | | | 52/64 |
| 4,015,718 | A | * | 4/1977 | Bernard | .................... | B62H 3/08 |
| | | | | | | 211/5 |
| 4,433,787 | A | | 2/1984 | Cook et al. | | |
| 4,807,453 | A | | 2/1989 | Bernier et al. | | |

(Continued)

FOREIGN PATENT DOCUMENTS

CH         683248 A5    2/1994
DE      19623924 A1   12/1997
(Continued)

*Primary Examiner* — Ko H Chan
(74) *Attorney, Agent, or Firm* — Paul & Paul

(57) ABSTRACT

An integrated rack and lock station for a bicycle includes a front wheel well adapted to receive and enclose at least a portion of the front wheel of the bicycle and a lock bar assembly which can be extended from within the wheel well and lock the rear wheel and frame of the bicycle to the station.

15 Claims, 18 Drawing Sheets

(56) References Cited

U.S. PATENT DOCUMENTS

| | | | |
|---|---|---|---|
| 5,278,538 A * | 1/1994 | Ainsworth | B62H 3/04 180/287 |
| 5,323,915 A | 6/1994 | Fortune, Sr. et al. | |
| 5,743,411 A * | 4/1998 | Hawkes | B62H 3/04 211/19 |
| 5,901,725 A * | 5/1999 | Libby | B62H 3/04 135/117 |
| 7,648,151 B2 | 1/2010 | Pedrini | |
| 8,065,895 B2 | 11/2011 | Andersen | |
| 9,381,964 B2 | 7/2016 | Haidak et al. | |
| 9,758,203 B2 | 9/2017 | Oviatt | |
| 9,830,759 B2 | 11/2017 | Hilton et al. | |
| 9,840,293 B2 | 12/2017 | Little | |
| 9,840,855 B2 | 12/2017 | Lin | |
| 9,862,440 B2 | 1/2018 | Steinman et al. | |
| 9,908,576 B2 | 3/2018 | McPherson | |
| 9,920,547 B1 | 3/2018 | Greenblatt et al. | |
| 9,932,759 B2 | 4/2018 | Mohamed | |
| 9,956,922 B2 | 5/2018 | Phillips | |
| 10,112,667 B2 | 10/2018 | Fournier | |
| 2002/0095960 A1 | 7/2002 | Grover | |
| 2007/0022670 A1 | 2/2007 | Herter | |
| 2009/0307992 A1 | 12/2009 | Kea, Jr. et al. | |
| 2010/0178140 A1 * | 7/2010 | Chang | B62H 3/00 414/228 |
| 2014/0311996 A1 * | 10/2014 | Oviatt | B62H 3/02 211/5 |
| 2015/0102714 A1 | 4/2015 | Gonzalez Hernandez et al. | |
| 2015/0330109 A1 * | 11/2015 | Tepper | G07C 9/00571 700/237 |
| 2018/0141603 A1 | 5/2018 | Byun | |
| 2018/0297658 A1 | 10/2018 | Mercat | |
| 2019/0118387 A1 * | 4/2019 | Morita | B25J 9/1682 |
| 2019/0135362 A1 * | 5/2019 | Fournier | B62H 3/04 |

FOREIGN PATENT DOCUMENTS

| | | |
|---|---|---|
| EP | 0587452 B1 | 1/1998 |
| EP | 2364900 A2 | 9/2011 |
| FR | 2789646 B1 | 8/2000 |
| GB | 2312882 A | 11/1997 |
| KR | 20110010361 A | 2/2011 |
| KR | 20110066842 A | 6/2011 |
| KR | 101471783 B1 | 12/2014 |

* cited by examiner

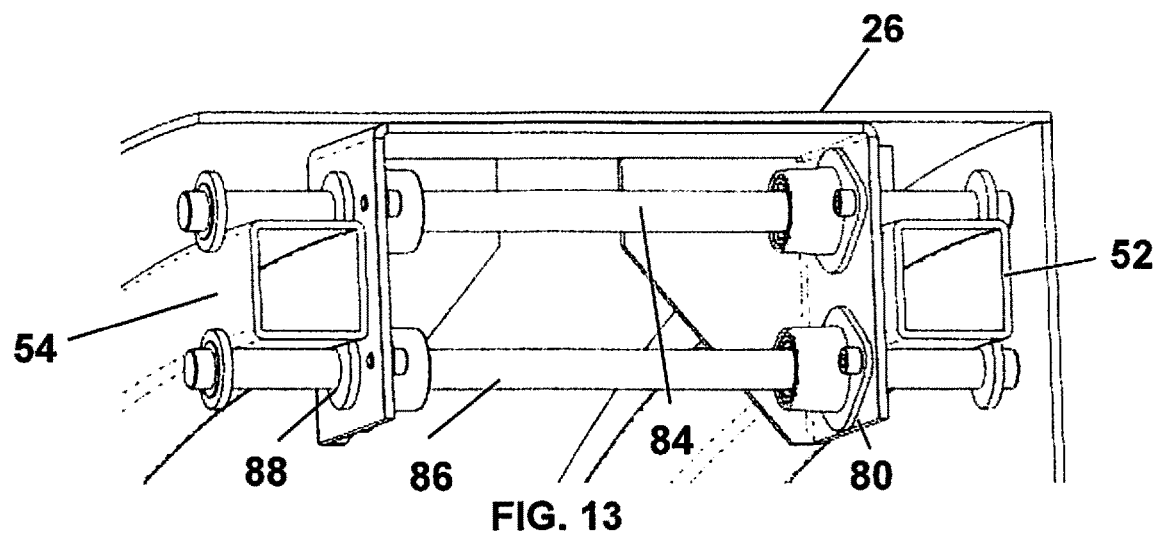
FIG. 13
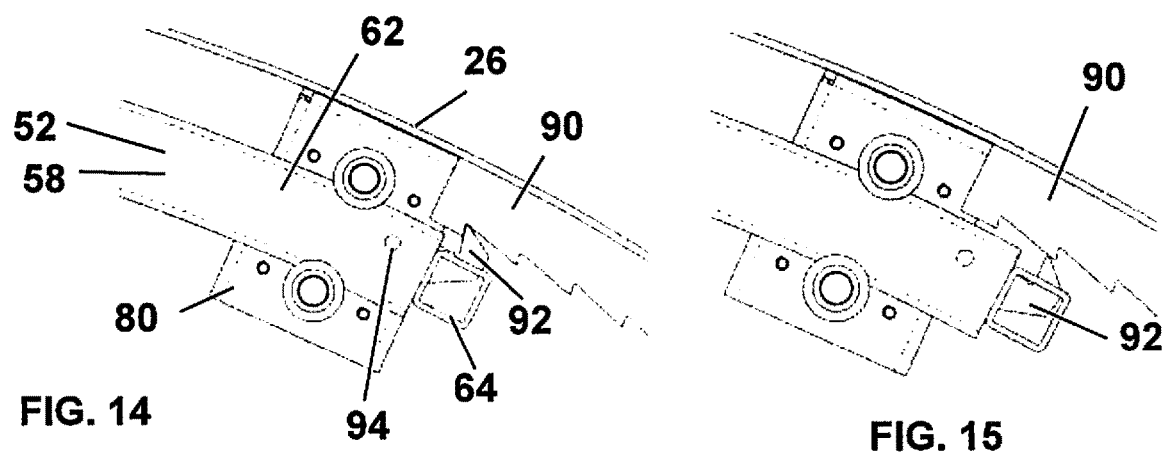
FIG. 14
FIG. 15
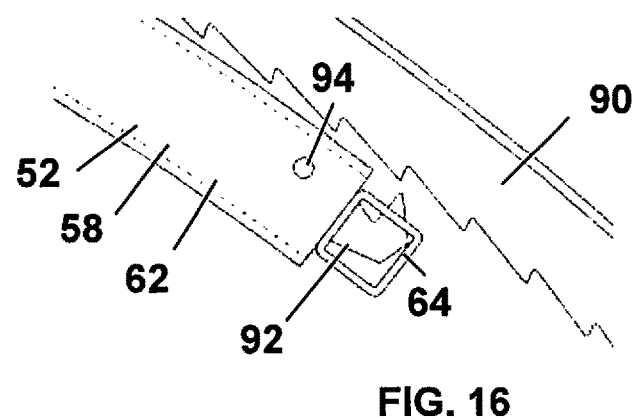
FIG. 16

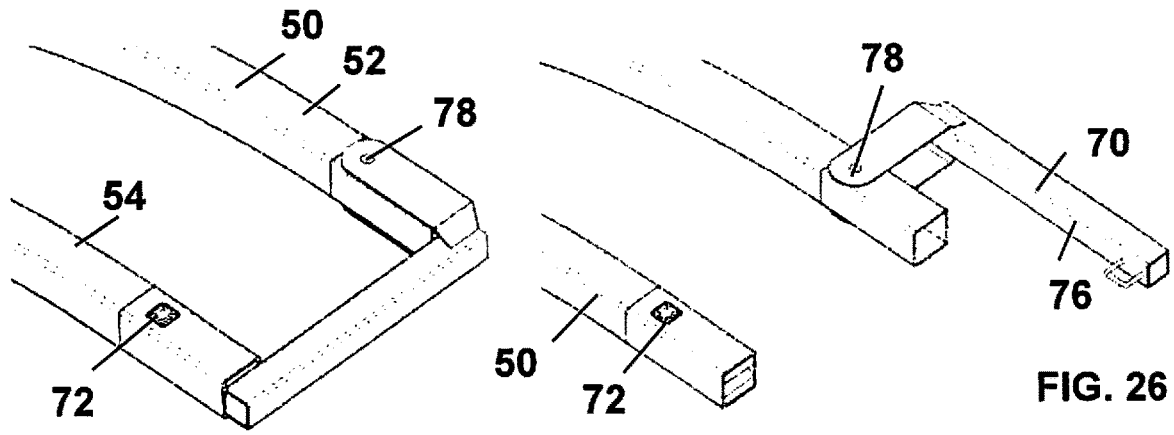
FIG. 27
FIG. 26
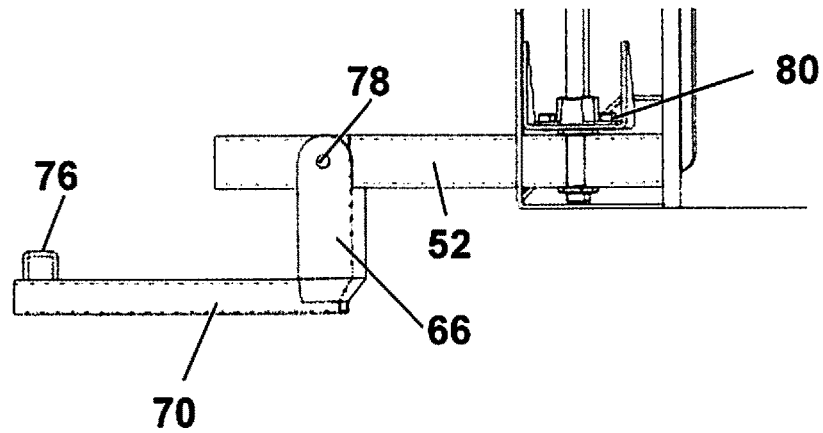
FIG. 28
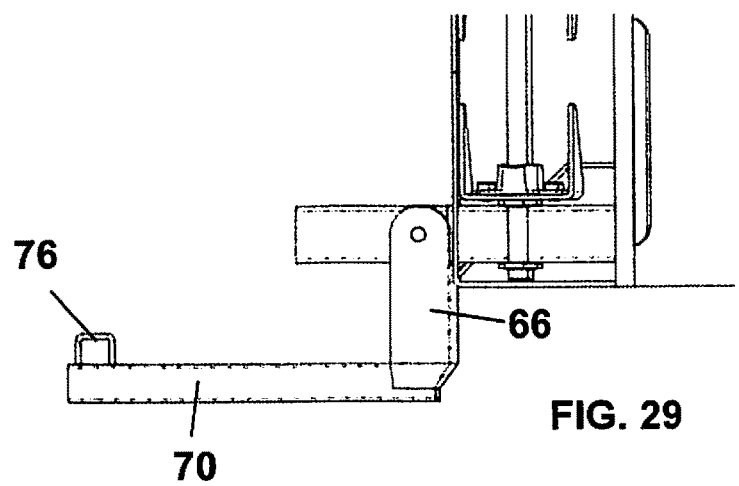
FIG. 29

INTEGRATED BICYCLE RACK AND LOCK STATION

CROSS-REFERENCE TO RELATED APPLICATION

This application claims the priority of U.S. Provisional Patent Application 62/671,384, filed May 14, 2018, which is incorporated by reference in its entirety herein.

BACKGROUND OF THE INVENTION

1. Field of the Invention

The present invention relates to a device for securing bicycles.

2. Brief Description of the Prior Art

Bicycle security in urban space is recognized as a major issue in cities throughout the United States and is being addressed with Federal and State funding to reduce the incidence of bicycle theft. As urban areas are experiencing a resurgence in popularization by young professionals, traffic congestion has given rise to a growing number of bicycle commuters. However, security of these bicycles has not advanced to meet this growing demand. Current methods of securing a bicycle are outdated and insufficient. The commonly accepted practice of bicycle safekeeping is performed by the rider supplying a personal bike lock used to secure the bike to an anchor point. This is typically a bicycle rack or other stationary object. This bicycle lock must be carried by the bicyclist. However, bike theft has become increasingly more sophisticated and the only counteraction has been the manufacture of personal bike locks that are larger, heavier and more cumbersome to carry. Generally, commuters that use their bicycle to travel to work go to the same destination each day. There is a need for a bicycle securing device which provides maximum security for a bicycle in public space without the need to carry personal bike locks.

Standard bicycle racks provide only a solid anchor point for which to attach a bike using a separate bike lock. In order to properly secure a bicycle, one must now physically restrain the front wheel, rear wheel and bicycle frame. This is not achievable with standard U-Locks. Therefore, to effectively secure a personal bike, one must carry two locks or a lock and a chain.

SUMMARY OF THE INVENTION

The present invention provides a bicycle lock station with a locking mechanism which is integral to the bike rack. The lock station can secure the three most vulnerable components of any bicycle with ease and efficiency, namely, the front wheel, the rear wheel, and the frame. This provides the maximum security for a bicycle. The integrated bicycle rack and lock station of the present invention is capable of securing a wide range of sizes of bicycles. The bicycle lock station can optionally incorporate anti-theft devices which include tamper resistance alarms activated when excessive force is applied to any component of the lock station when the station is in a locked condition.

In a presently preferred embodiment the present invention provides an integrated rack and lock station for a bicycle, the station comprising a front wheel well having an interior and adapted to receive and enclose at least a portion of the front wheel of the bicycle. The station also preferably includes a lock bar assembly moveably attached to the front wheel well member, the lock bar assembly being moveable from a first position to a second position. Preferably, the lock bar assembly extends substantially within the front wheel well in the first position, and substantially over the bicycle in the second position. Preferably, the station also includes means for securing the bicycle to the lock bar assembly. Preferably, the lock bar assembly includes a pair of generally parallel arms. Preferably, each of the arms has a first end and a second end, the second end protruding from the front wheel well member when the lock bar assembly is in the second position. Preferably, the lock bar assembly further includes a latch, the latch being moveable from a first unlatched position to at least one second latched position, the latch extending from the second end of one of the arms, the latch being extendable through the rear wheel of the bicycle when the lock bar assembly is in the second position. Preferably, the integrated rack and lock station further includes at least one guide roller attached to the front wheel well, the at least one guide roller supporting the lock bar assembly. Preferably, the integrated rack and lock station further includes at least two guide rollers attached to the front wheel well, the at least two guide rollers guiding the motion of the lock bar assembly as the lock bar assembly is moved between the first position and the second position. Preferably, the integrated rack and lock station further includes a generally arc-shaped ratchet rack secured to the interior of the front wheel well, the ratchet rack being generally parallel to and spaced from one of the arms of the lock bar assembly. Preferably, the integrated rack and lock station further includes a releasable ratchet catch pivotably mounted on an end of an arm of the lock bar assembly and adapted for engagement with the ratchet rack, such that engagement of the ratchet catch with the ratchet rack prevents motion of the lock bar assembly in a first direction from the first position to the second position but not in a second direction from the second position to the first position. Preferably, the integrated rack and lock station further includes a spring for urging the lock bar assembly from the at least one second position to the first position. Preferably, the arms of the lock bar assembly are tubular, and the station further includes a cable extending within a tubular arm between the ratchet catch and the latch, the cable being adapted to release the ratchet catch from the ratchet rack when the latch is in the open position. Preferably, the latch is biased to close when in the open position. Preferably, the latch is locked in the latched position by a releasable locking device. Preferably, the locking device is adapted to be electronically released, via activation of a solenoid device. Preferably, the locking device is provided with a locked state in which the locking device can be electronically released, and a locked state in which the locking device can be manually released. Preferably, the state of the locking device can be changed remotely. Preferably, the means for remotely controlling the state of the locking device is electrical. Preferably, the lock bar assembly is arc-shaped.

BRIEF DESCRIPTION OF THE DRAWINGS

FIG. 13 is fragmentary sectional perspective view of the integrated rack and lock station of FIG. 1 showing the mounting of a guide roller assembly.

FIG. 14 is a fragmentary side elevational sectional view of the integrated rack and lock station of FIG. 1 with the lock bar assembly in the fully extended position and the ratchet catch engaging the ratchet rack.

FIG. 15 is a fragmentary side elevational sectional view of the integrated rack and lock station of FIG. 14 with the lock bar assembly in a partially extended position and the ratchet catch partially disengaged from the ratchet rack.

FIG. 16 is a fragmentary side elevational sectional view of the integrated rack and lock station of FIG. 14 with the lock bar assembly in a partially extended position and the ratchet catch fully disengaged from the ratchet rack.

FIG. 26 is a fragmentary perspective view of the outer end of the lock bar assembly 50 showing the latch in the open position.

FIG. 27 is a fragmentary perspective view of a first embodiment of the outer end of the lock bar assembly 50 showing the latch in the closed position.

FIG. 28 is a fragmentary sectional view of the station of FIG. 1 showing the latch in the open position with the lock bar assembly extending between the fully open position and the fully closed position.

FIG. 29 is a fragmentary sectional view of the station of FIG. 1 showing the lock bar assembly having been retracted toward the fully closed position by the action of the constant force spring such that the side plates 68 of the locking bar contact the upper panel of the front of the well.

DETAILED DESCRIPTION OF THE PREFERRED EMBODIMENTS

Figure 1:
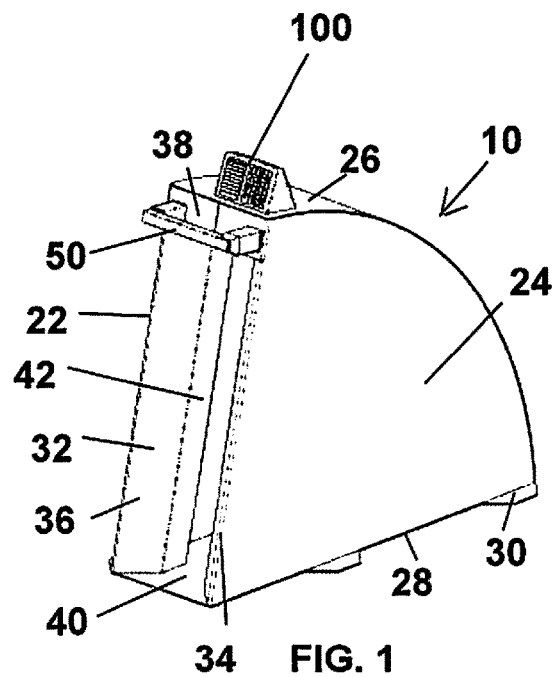
FIG. 1 is a perspective view of a first embodiment of an integrated rack and lock station with the lock arm assembly in the fully retracted position.

The present invention provides a complete integrated bicycle locking station. The front wheel of the bicycle is received by a front wheel well of the station. This protects the front wheel from theft by making the front wheel axle inaccessible so the front wheel cannot be removed.

The station includes a lock arm assembly which functions to secure a user's bicycle. When the lock arm assembly is in an extended position, it can be used to secure a bicycle.

A latch is provided at one end of the lock arm assembly to secure the bicycle rear wheel and frame to the station. The lock arm assembly automatically retracts from an extended position to assume a neutral, safe and locked position. This is accomplished by use of a constant force spring. In this state, the station is in a locked down condition and the latch cannot be opened or the lock arm assembly withdrawn from the front wheel well. Preferably, when a user is recognized by an appropriate key code entered into a keypad control or other means such as RFID or Mobile App recognition, the user releases the latch and then can extend the lock arm assembly. When the latch is in the open position, the lock arm assembly can be withdrawn from the wheel well. The bicycle rider can thread the latch between the spokes of the rear wheel and close the latch to secure the bicycle. When the rider returns, he or she can enter the necessary code into the keypad control to activate the lock mechanism to release the latch. At this point the lock bar assembly will automatically retract.

The present invention advantageously provides a bicycle security station that secures the three most stolen components to a bicycle: front wheel, rear wheel and bike frame. The station adapts and is adjustable for "most" styles and sizes of bicycles by having a lock arm assembly travel in the clearance space associated with where the bicyclist's legs occupy while riding. The station simultaneously locks the rear wheel and frame. The station uses a latch that, when engaged in the locking position, captures the triangular frame structure that mounts the rear wheel. This is the means employed to secure the bicycle frame. The station utilizes a latch which captures the rear wheel and prevents the rear wheel from being separated from the frame. This is the means employed to secure the rear wheel. The station protects the front wheel from theft by making the front axle inaccessible. A front wheel well prevents access to the front wheel axle and therefore from removal of this axle from the bicycle forks. This is the means employed to secure the front wheel. Preferably, the front wheel well conceals and make inaccessible the fasteners that secure the frame of the well to the base.

Preferably, the station is formed from tough, vandal resistant materials such as steel or a suitable synthetic material.

The station includes a lock arm assembly which is a sliding member that projects out of the structural housing. Alternatively, the lock arm assembly could rotate out on a common pivoting axis, or extend out in a linear fashion, or otherwise, as long as the assembly includes projecting parallel locking arms. The lock arm assembly's trajectory takes advantage of the necessary open space of the cyclist's legs when riding. In the extended position the lock arm assembly with the latch positioned through the rear wheel and engaged in the latch lock secures the rear wheel and frame to the station.

The station preferably uses a ratchet mechanism including a ratchet rack and a ratchet catch to ensure that once the ratchet is engaged the lock arm assembly cannot be extended further. When the latch is opened, the lock arm assembly is freed because the ratchet catch is released from the ratchet rack. A cable extends through one of the arms of the lock bar assembly, which preferably includes a pair of hollow tubes, and links the pivoting latch with the ratchet catch. When the rider swings the latch to the open position, the motion is transmitted through the cable to the ratchet catch which pivots away from the ratchet rack and is released. The tube can have a square, round or other cross section.

Preferably, the latch cannot be released unless the rider has entered a suitable code into the keypad control or other means to activate a solenoid. When a proper code is entered, a voltage is applied to operate an electromagnetic solenoid which moves a locking cage internal to the latch locking mechanism to free the latch for removal. Power for the mechanism is preferably provided by wires extending through one of the tubes of the lock arm assembly.

The station preferably uses a constant force spring to provide a retracting force for the lock arm assembly. The constant force spring can be, for example, a coil spring, a torsion spring, an extension spring, or gas shock/spring, to provide a spring-powered self-retracting function. Thus, the system automatically retracts the lock arm assembly when the lock arm is not engaged on a bicycle, and automatically assumes a neutral, safe state when a bicycle is not present. By retracting the lock arm assembly and securing this assembly in place, the station assumes a neutral, safe, locked position when not in use, and provides for public safety.

Preferably, the latch is biased to close when in an open position.

Preferably, the station uses hidden and/or inaccessible fasteners for disassembly when a bicycle occupies the station.

Preferably, the station allows for as little as eleven inches center to center distance between two adjacent stations to permit high density bicycle parking.

Preferably, the station is modular in nature, such that any number of units (stations) can be connected together.

Preferably, each single station is modular in nature, such that adjacent individual lock stations can be orientated 180 degrees in relation to one another. Preferably, adjacent modular stations can exist at different elevations and orientation angles to allow adjacently parked bicycles' handlebars to avoid interference.

Preferably, the station utilizes a lithium ion battery that is rechargeable by solar technology to power each of the electronic/electrical components of the station. Preferably, each modular station is provided with an independent battery pack and meter.

Preferably, the station is provided with an accelerometer which will activate an audible alarm and lighted beacon for theft deterrence.

Figure 4:
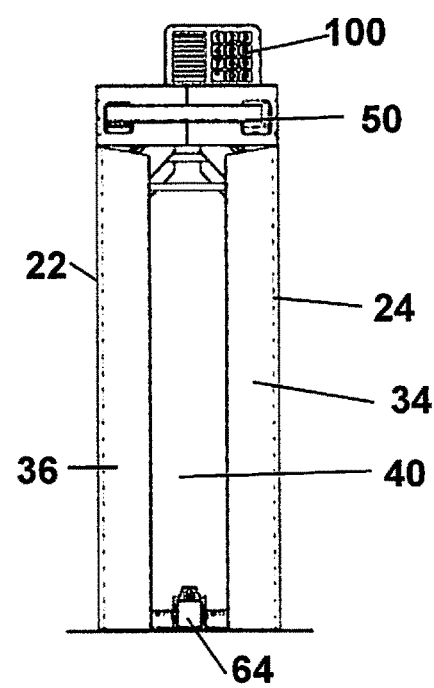
FIG. 4 is a front elevational view of the lock station of FIG. 1.
Figure 5:
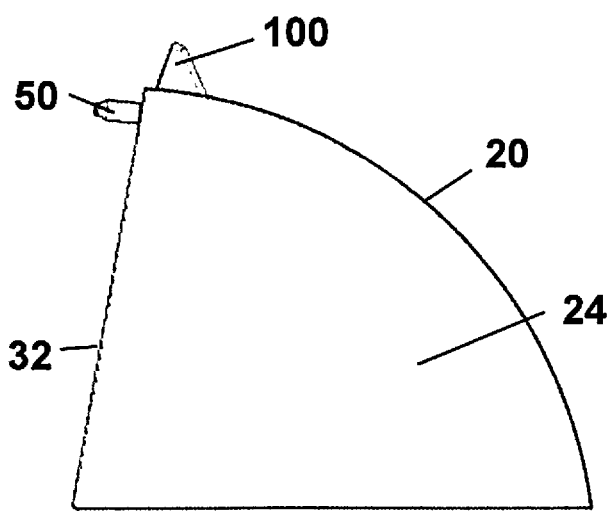
FIG. 5 is a right side elevational view of the lock station of FIG. 1
Figure 12:
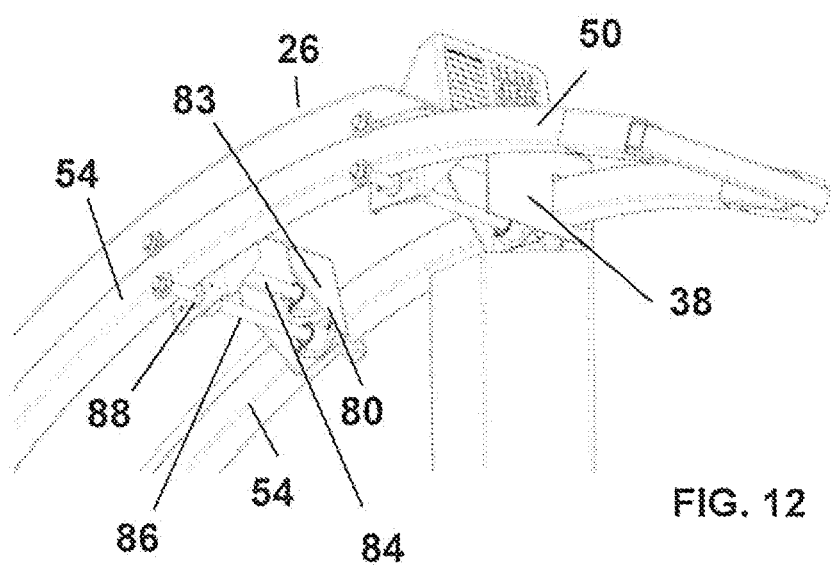
FIG. 12 is a fragmentary view of the integrated rack and lock station of FIG. 1 shown from the left side and below with the lock bar in a partially extended position.

Referring now to the figures in which like reference numerals represent like elements in each of the several views, there is shown in FIG. 1 a perspective view of an embodiment of an integrated rack and lock station 10 with a lock bar assembly 50 in a fully retracted position. The lock station 10 includes a wheel well member 20 for receiving the front wheel of a bicycle (not shown). The well 20 includes an upstanding left side 22 generally perpendicular to the bottom or base 28, and an upstanding right side 24 parallel to the left side 22 of the well 20. The sides 22, 24 take the form of a truncated half circle or other circular arc. In the alternative, the sides can be any other shape which does not interfere with the operation of the lock bar assembly 50. For example, different shapes can be selected for aesthetic reasons. The semicircular portions of the sides 22, 24 are covered with a well top 26. A keypad control 100 is positioned at the front of the well 20 upon the top 26 of the well 20 or other location of the unit. The front 32 of the well 20 is adapted to receive the front wheel of a bicycle in a front wheel aperture 40. On the front 32 of the well 20 are a right side panel 34 and left side panel 36 which extend from the base 28 of the well 20 almost the entire distance to the top 26 of the well 20 (best seen in the front elevational view of FIG. 4), which together provide a front wheel axle guard 42. Extending between the sides 22, 24 and the top 26 and the side panels 34, 36 is an upper panel 38. Protruding from the upper panel 38 is the lock bar assembly 50 which functions to secure a bicycle to the station by capturing the rear wheel and frame when the front wheel of the bicycle is positioned in the front wheel aperture 40 in the front 32 of the well 20. As best seen in FIG. 12, the arms 52, 54 of the lock bar assembly protrude through conforming apertures formed in the upper panel 38 of the front 32 of the well 20.

Figure 2:
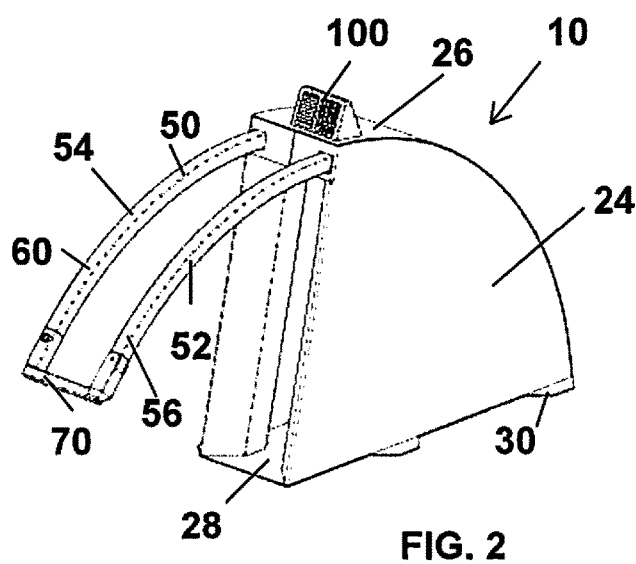
FIG. 2 is a perspective view of the integrated rack and lock station with the lock arm assembly in a fully extended position.
Figure 6:
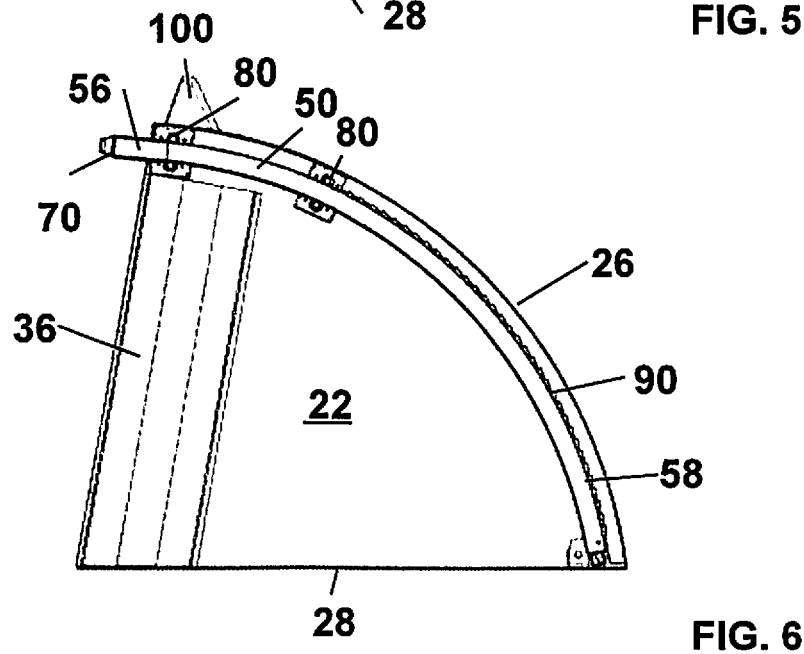
FIG. 6 is right side elevational sectional view of the integrated rack and lock station of FIG. 1 taken along the line I-I of FIG. 3.

FIG. 2 is a perspective view of the integrated rack and lock station of FIG. 1 shown with the lock bar assembly 50 shown in a fully extended position. The lock bar assembly 50 can be extended and locked in a series of positions each extending further from the well 20 such that the station 10 can accommodate a great variety of bicycle frame sizes and configurations. The lock bar assembly 50 includes two generally arc-shaped arms, namely a right arm 52 and a left arm 54. The right arm 52 includes a first or outer end 56 and a second or inner end 58 (best seen in the sectional side elevational view of FIG. 6). The left arm 54 also includes a first or outer end 60 and a second or inner end 62. The outer ends 56. 58 of the right and left arms 52, 54 are joined by a latch 70. The inner ends 58, 62 of the right and left arms 52, 54 are joined by a cross member 64. The lock bar assembly 50 is suspended on a pair of lock bar assembly guide rollers 80 mounted inside the well on the underside of the top 26 of the well 20 (FIG. 6).

Figure 7:
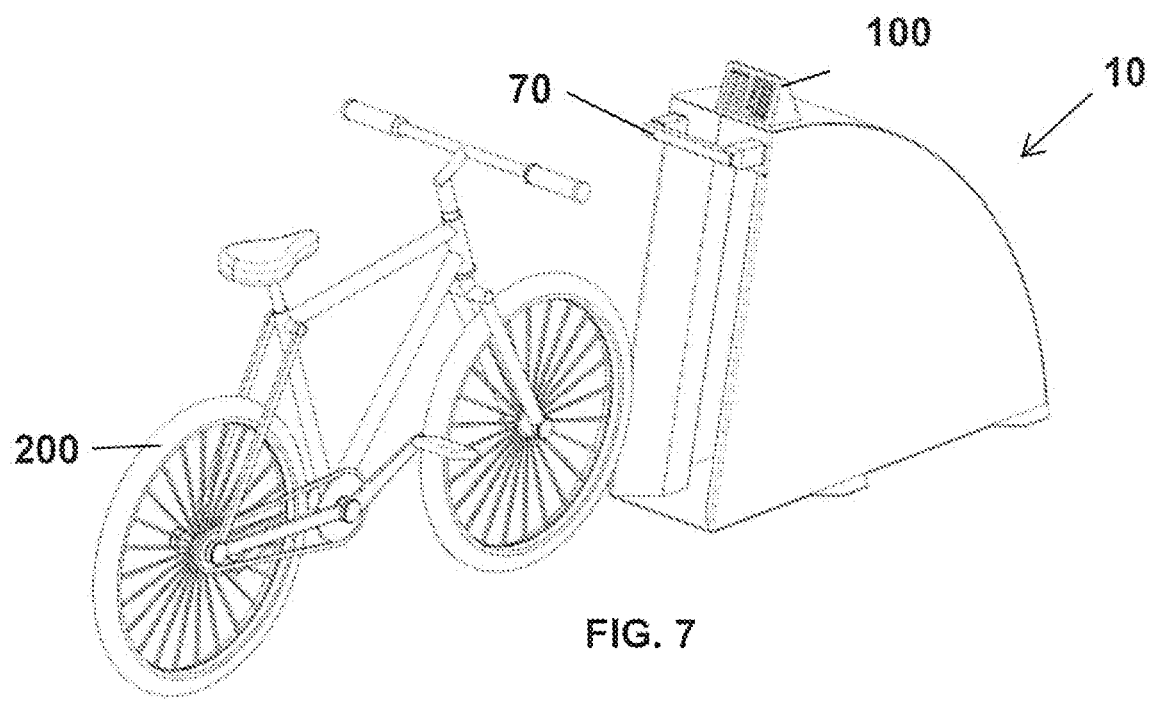
FIG. 7 is a perspective view of the integrated rack and lock station of FIG. 1 shown with a bicycle approaching the station.
Figure 8:
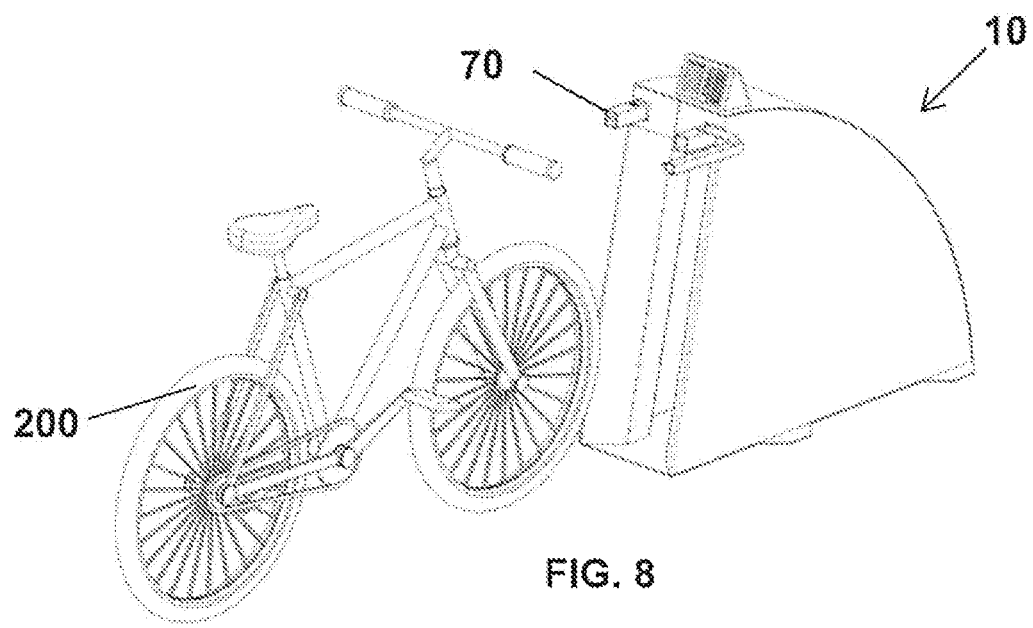
FIG. 8 is a perspective view of the integrated rack and lock station of FIG. 7 shown with a bicycle approaching the station, the latch in the open position with the lock arm assembly substantially retracted.
Figure 9:
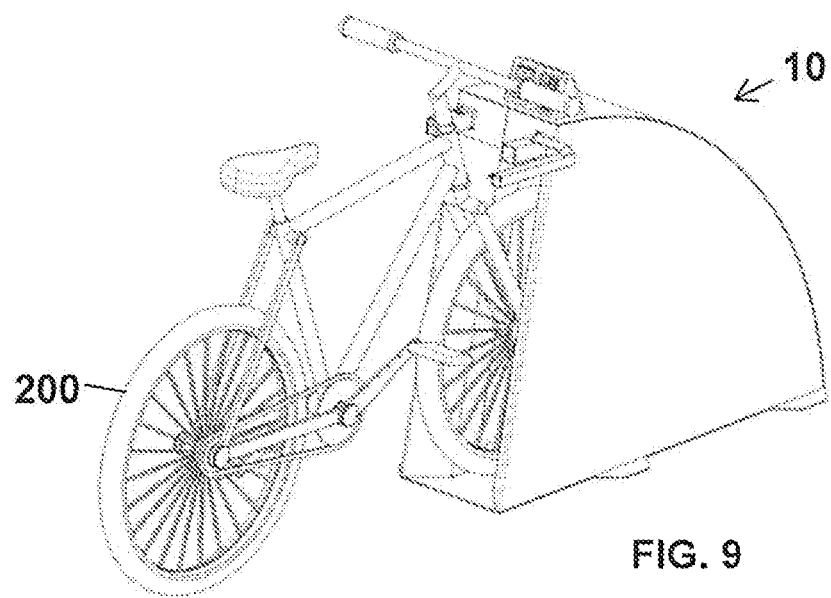
FIG. 9 is a perspective view of the integrated rack and lock station of FIG. 7 shown with the bicycle's front wheel being positioned inside the station, the latch in the open position with the lock arm assembly substantially retracted.
Figure 10:
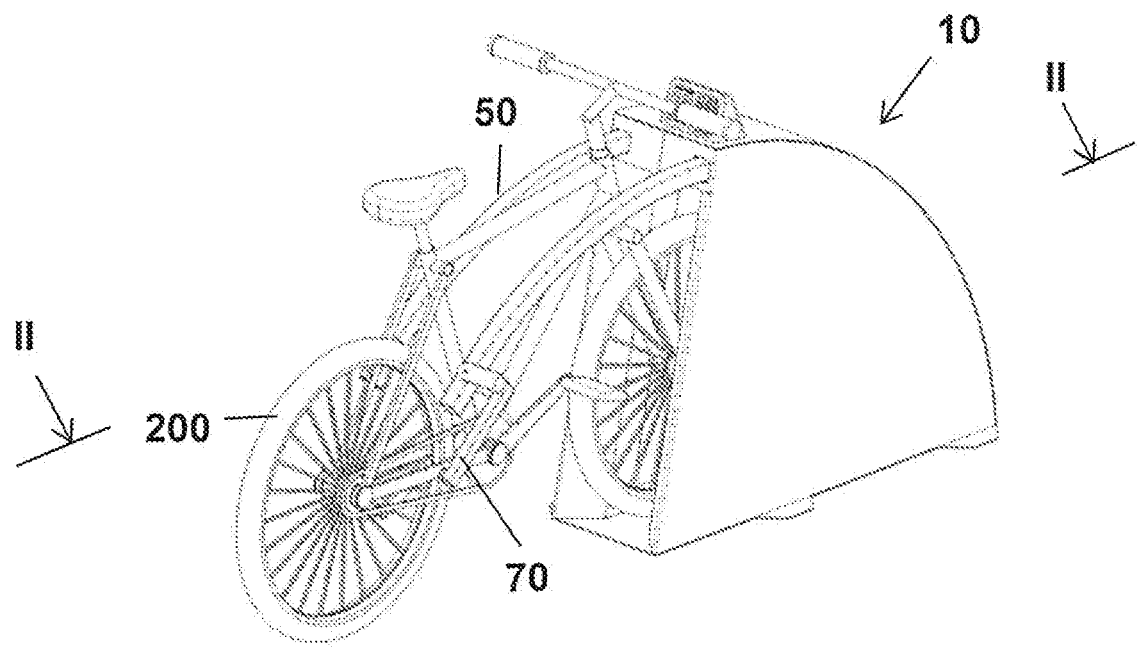
FIG. 10 is a perspective view of the integrated rack and lock station of FIG. 7 shown with the bicycle's front wheel being positioned inside the station, the latch in the open position with the lock arm assembly extended over the bicycle.
Figure 11:
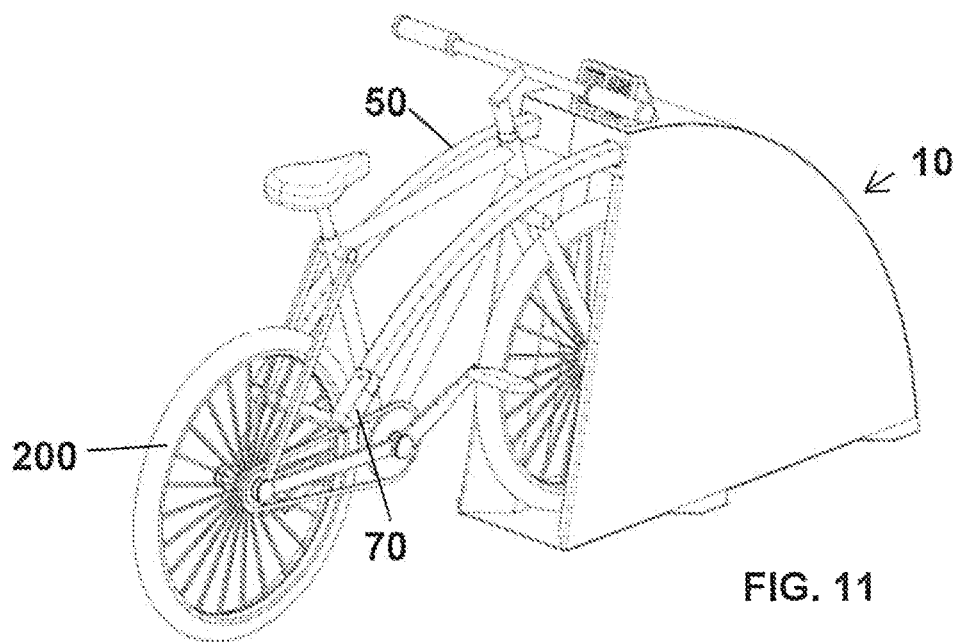
FIG. 11 is a right side perspective view of the integrated rack and lock station of FIG. 9 shown with the bicycle's front wheel being positioned inside the station, the latch in the closed position and extending through the rear wheel and frame of the bicycle.

FIGS. 7-11 illustrate operation of the station 10. Initially, a bicycle 200 is positioned in front of the station 10 and the rider (not shown) enters an appropriate code into the keypad control 100 (FIG. 7). The control 100 then sends an "unlock" command to the latch 70 so that the rider can open the latch 70 as shown in FIG. 8. The rider can then push the front wheel of the bicycle 200 into the aperture 40 where the front wheel is secured between the right side panel 34 and the left side panel 36. The width of the aperture 40 is sized to prevent access to the locking mechanism (e.g. quick release) holding the front wheel on the bicycle 200. The rider can now pull the lock bar assembly 50 out of the well 20 until the outer ends 56. 60 of the right and left arms 52, 54 are positioned on either side of the bicycle proximate the triangular area conventionally formed by the bicycle frame at the rear of the bicycle (FIG. 10).

Figure 3:
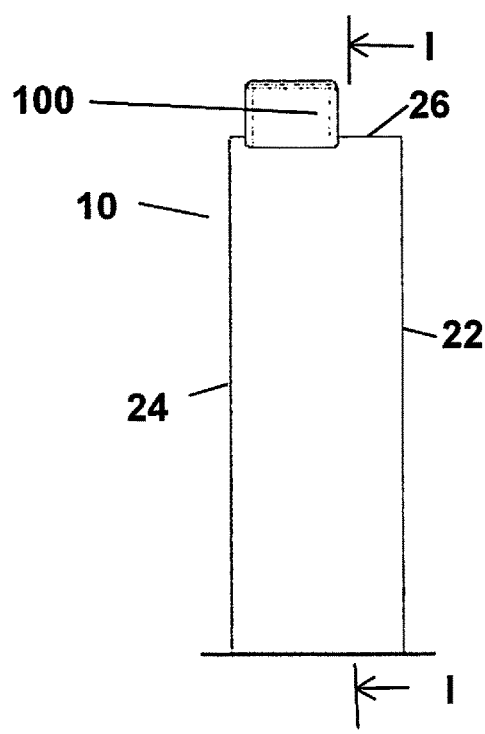
FIG. 3 is a rear elevational view of the lock station of FIG. 1.

FIG. 12 is a fragmentary view of the integrated rack and lock station of FIG. 1 shown from the left side and below with the lock bar assembly 50 in a partially extended position. The guide rollers 80 each include a frame 82 including a top and parallel downwardly extending walls in which upper and lower guide roller spindles 84, 86 are mounted on anti-friction bearings 88. As can be seen in the fragmentary sectional perspective view of FIG. 3, the right and left arms 52, 54 are tubular and have a square cross-section.

FIGS. 14-20 illustrate the operation of a locking mechanism for the lock bar assembly 50. Initially, when the lock bar assembly 50 is in the fully extended position, a ratchet catch 92 mounted at the inner end of one of the arms 52, 54 (the right arm is shown in FIG. 14) engages one of the teeth of the ratchet rack 90. The ratchet catch 92 is rotatably mounted on a pivot pin 94 and connected to the latch 70 at the outer end of the lock bar assembly 50 by suitable means, such as a cable or wire 98, such that when the latch 70 is closed, the ratchet catch 92 is drawn against the ratchet rack 90 by a spring (not shown) against the ratchet catch when the cable 98 relieves tension to this spring. When the latch 70 is opened, the tension in the cable 98 forces the ratchet catch spring to extend and simultaneously disengages the ratchet catch from the ratchet rack and the lock bar assembly 50 can be retracted (or extended) relative to the well 20, as the ratchet catch 92 is free to rotate away from the ratchet rack 90 (FIGS. 15, 16).

Figure 18:
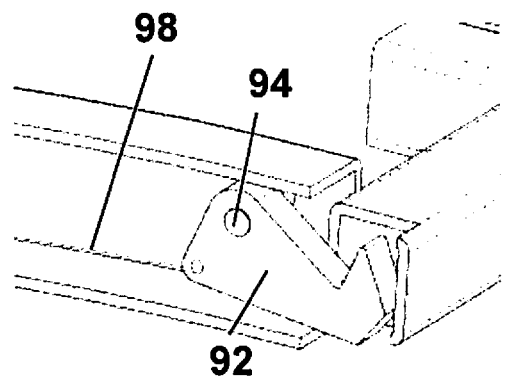
FIG. 18 is a cutaway view of the integrated rack and lock station of FIG. 17, showing the ratchet catch pivoting on the pin and attached to a cable for operation of the ratchet catch against the ratchet rack.
Figure 17:
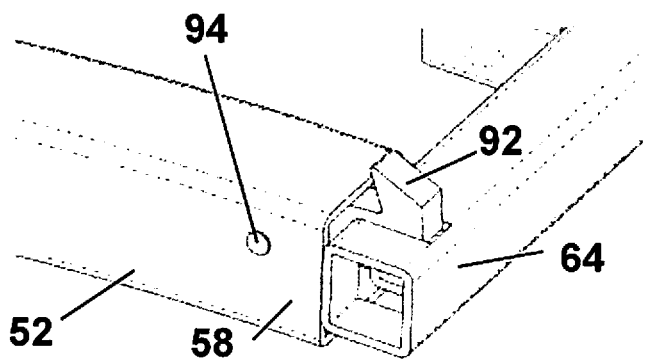
FIG. 17 is a fragmentary perspective sectional view of the integrated rack and lock station of FIG. 1 showing the ratchet catch.
Figure 19:
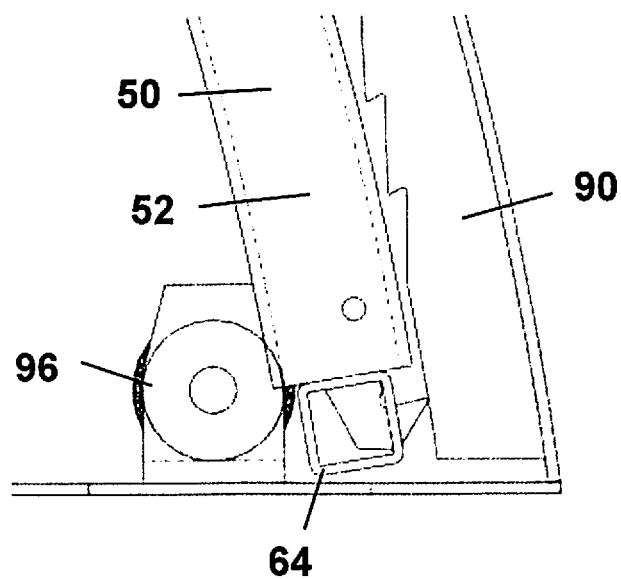
FIG. 19 is a fragmentary elevational view of the bottom rear of the well showing the ratchet rack, the right arm of the lock bar assembly and a constant force spring.

FIG. 17 is a fragmentary perspective view showing a portion of the inner end of the lock bar assembly 50 with the ratchet catch 92 protruding through an aperture formed in the cross member 64 or the ratchet catch 92 can be mounted outside the left arm 52 (not shown) and beyond cross bar 64. FIG. 18 is a cutaway view showing the ratchet catch 92 pivoting on the pin 94 and attached to a cable 98 for operation of the ratchet catch 92 against the ratchet rack 90. FIG. 19 is a fragmentary elevational view of the bottom rear of the well 20 showing the ratchet rack 90, the left arm 52 of the lock bar assembly 50 and a constant force spring 96 for retracting the lock bar assembly 50 into the well 20 when the latch 70 has been released.

Figure 20:
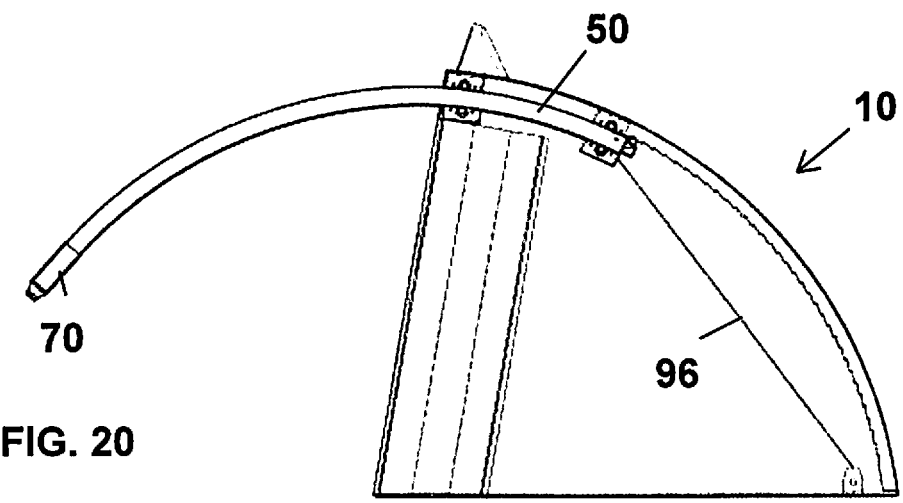
FIG. 20 is a sectional elevational view of the station of FIG. 1 shown with the lock bar assembly 50 in the fully extended position.
Figure 21:
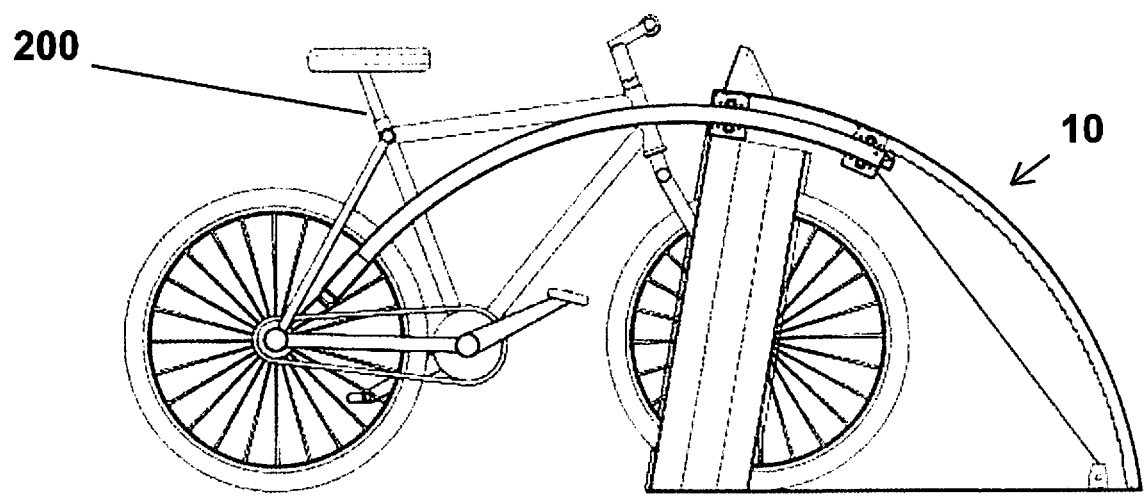
FIG. 21 is a sectional elevational view of the station of FIG. 1 shown with the lock bar assembly in a fully extended position securing a bicycle in the station.

FIG. 20 is a sectional elevational view of the station of FIG. 1 shown with the lock bar assembly 50 in the fully extended position. The constant force spring 96 extends from the base 28 at the rear of the well 20 to the cross member 64 of the lock bar assembly 50. FIG. 21 reproduces the view of FIG. 20 but in addition depicts a bicycle secured in the station 10.

Figure 22:
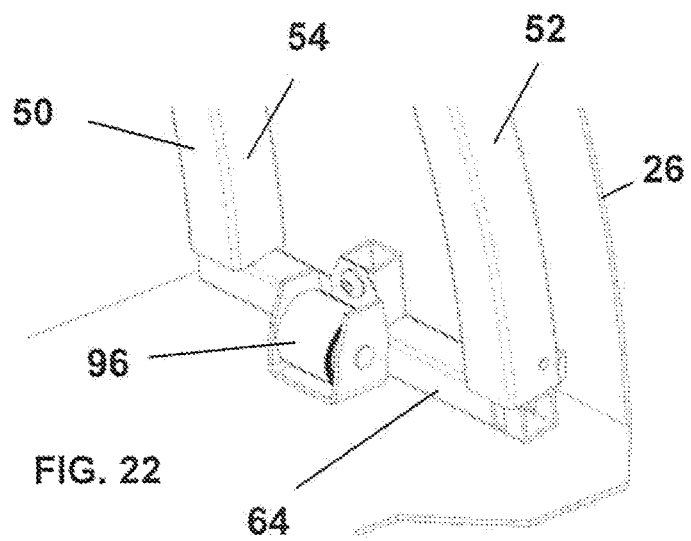
FIG. 22 is a fragmentary perspective view of the station of FIG. 1 showing the constant force spring in a fully retracted position.
Figure 23:
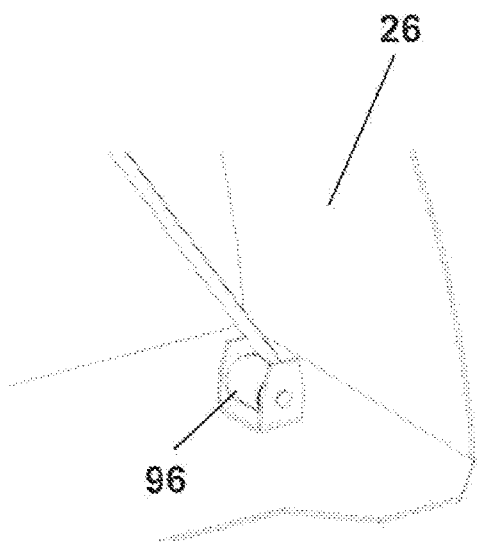
FIG. 23 is a fragmentary perspective view of the station of FIG. 1 showing the constant force spring in an extended position.
Figure 24:
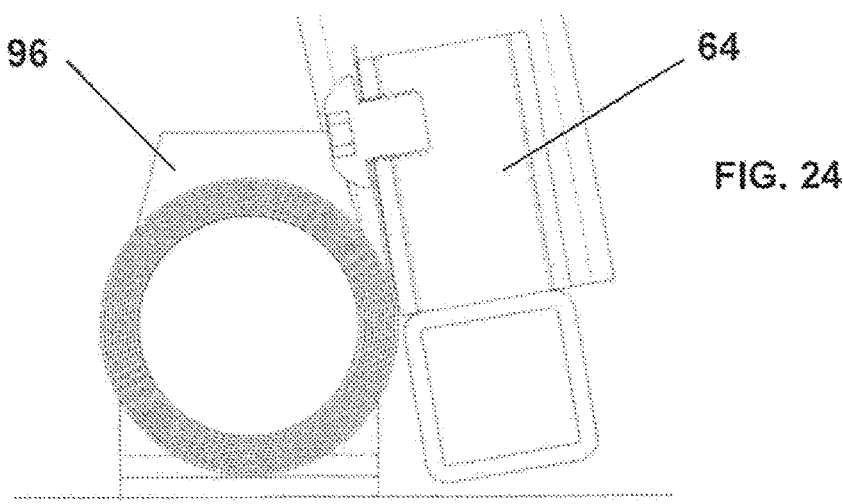
FIG. 24 is a fragmentary sectional elevational view of the station of FIG. 1 showing the constant force spring secured to the cross member of the lock bar assembly.
Figure 25:
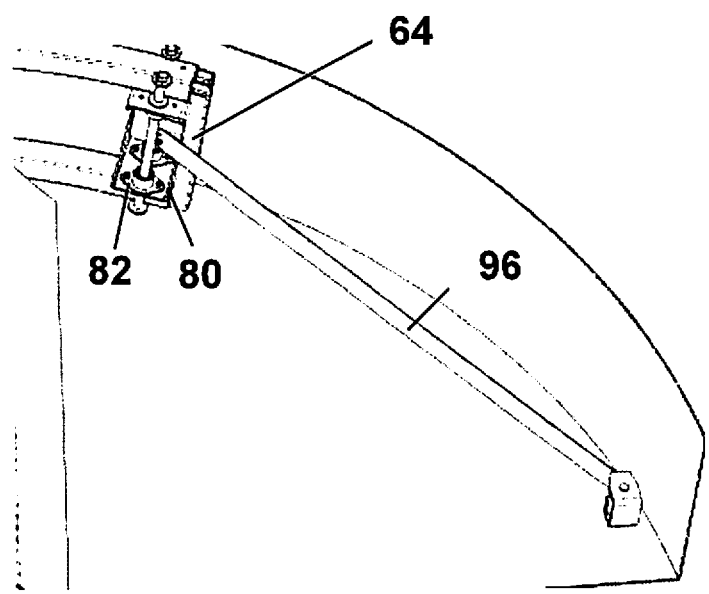
FIG. 25 is a fragmentary perspective view of the station of FIG. 1 showing the constant force spring as seen from below.

FIG. 22 is a fragmentary perspective view of the station of FIG. 1 showing the constant force spring in a fully retracted position. FIG. 23 is a fragmentary perspective view of the station of FIG. 1 showing the constant force spring 96 in an extended position. FIG. 24 is a fragmentary sectional elevational view of the station of FIG. 1 showing the constant force spring 96 secured to the cross member 64 of the lock bar assembly 50. FIG. 25 is a fragmentary perspective view of the station of FIG. 1 showing the constant force spring 96 as seen from below showing the attachment of the upper end of the constant force spring 96 to the frame 82 of the rear guide roller 80.

FIG. 26 is a fragmentary perspective view of the outer end of the lock bar assembly 50 showing the latch 70 in the open position. The latch 70 includes a locking bar 66 mounted in between a pair of side plates 68 extending perpendicularly from one end of the locking bar 66. A latch pivot pin 78 extends through one end of each of the side plates 68 and the right arm 52 of the lock bar assembly 50 to rotatably mount the latch 70 to the right arm 52. At the other end of the locking bar 66 a locking tongue 76 extends inwardly such that when the latch 70 is rotated on the pivot pin 78 to close the latch 70 (FIG. 27), the latch loop pin 76 protrudes into the outer end 60 of the left arm 54 of the lock arm assembly 50 where it is captured by a locking mechanism (not shown). The locking mechanism can be activated to release the latch loop pin 76 by activation of the solenoid (not shown) provided in the left arm 54 proximate the outer end 60 of the left arm 54. However, the latch loop pin cannot be removed from the lock device until the solenoid (not shown) is energized and moves the lock cage (not shown) by a user entering the proper code into the keypad control 100. The activation of the solenoid and release of the latch loop pin can include a remote actuation. The lock solenoid can be electrically connected to the keypad control 100 by, for example, an electrical conduit running through the left arm 54 of the lock bar assembly 50, by a wireless connection, or the like.

Figure 30:
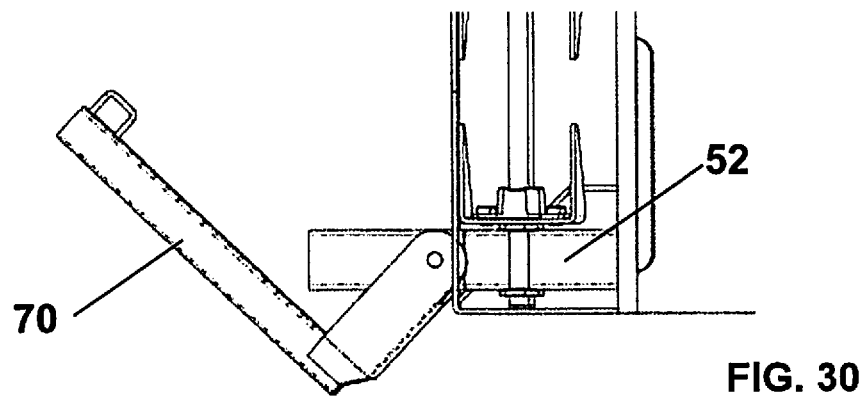
FIG. 30 is a fragmentary sectional view of the station of FIG. 1 showing the latch partially rotated towards closure.
Figure 31:
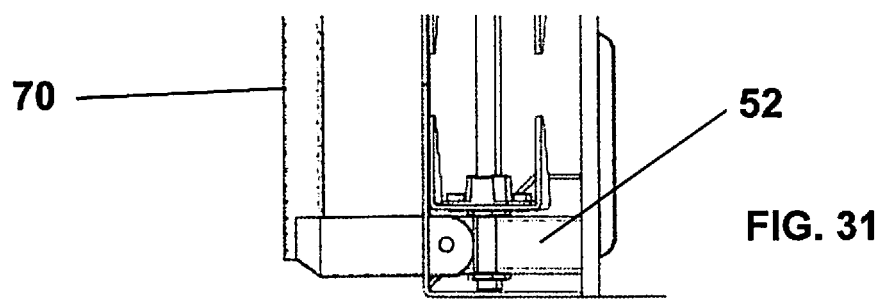
FIG. 31 is a fragmentary sectional view of the station of FIG. 1 showing the latch fully closed and captured within the apertures in the upper panel.

FIGS. 28-31 illustrate a self-locking feature of the latch 70. FIG. 28 is a fragmentary sectional view of the station of FIG. 1 showing the latch 70 in the open position with the lock bar assembly 50 extending between the fully open position and the fully closed position. FIG. 29 is a fragmentary sectional view of the station of FIG. 1 showing the lock bar assembly 50 having been retracted toward the fully closed position by the action of the constant force spring 96 such that the side plates 68 of the locking bar 66 contact the upper panel 38 of the front 32 of the well 20. The latch 70 is biased to close when in an open position. Two springs are provided to drive this action. One spring is attached to the ratchet catch prime mover (not shown). The second spring is a torsion spring mounted on the latch pivot pin 78 such that the torsion spring is torqued when the latch 70 is opened and thus exert a force urging the latch 70 to close. Shown in FIG. 30 is a fragmentary sectional view of the station of FIG. 1 showing the latch 70 partially rotated towards closure. FIG. 31 is a fragmentary sectional view of the station 10 of FIG. 1 showing the latch 70 fully closed and captured within the apertures in the upper panel 38.

Figure 32:
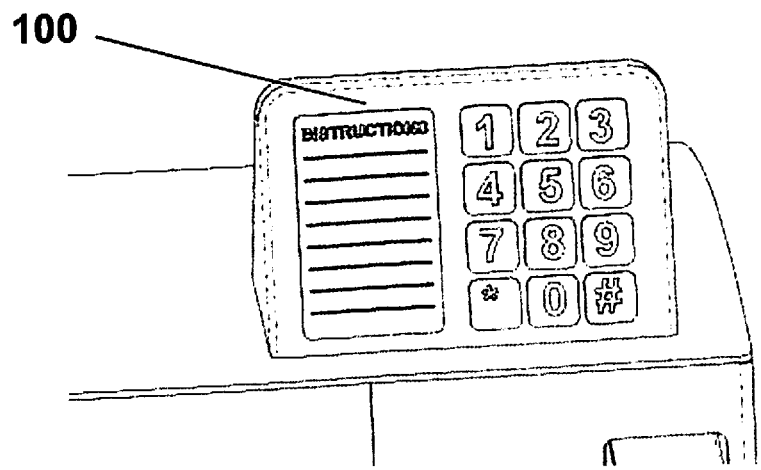
FIG. 32 is a fragmentary perspective view of the station of FIG. 1 showing the keypad control.

FIG. 32 is a fragmentary perspective view of the station 10 of FIG. 1 showing the keypad control 100.

Figure 33:
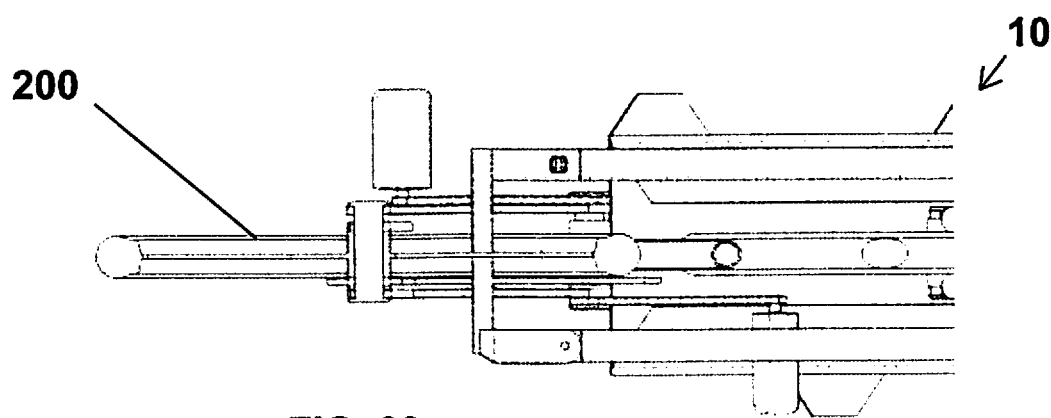
FIG. 33 is a fragmentary plan sectional view of a front portion of the station of FIG. 1 showing a bike locked in the station taken along the line II-II of FIG. 10

FIG. 33 is a fragmentary plan sectional view from the top of a rear portion of the station 10 of FIG. 1 showing a bike 200 locked in the station 10.

Figure 34:
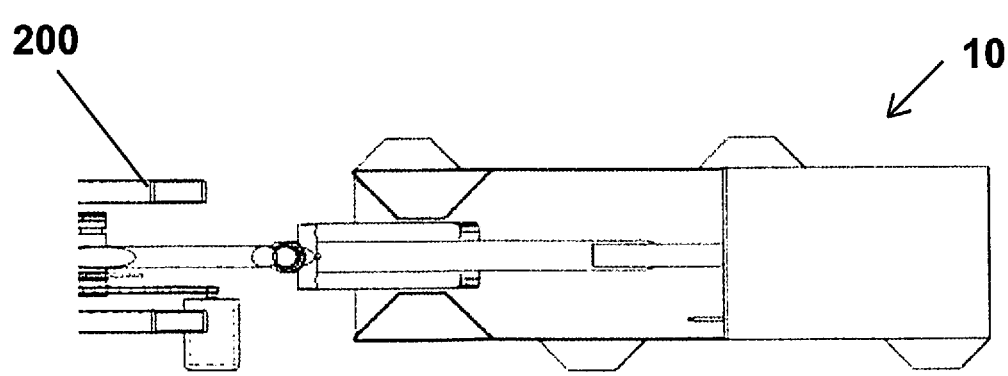
FIG. 34 is a fragmentary plan sectional view of a rear portion of the station of FIG. 1 showing a bike locked in the station.

FIG. 34 is a fragmentary plan sectional view of a front portion station 10 of FIG. 1 showing a bike 200 locked in the station 10.

Figure 35:
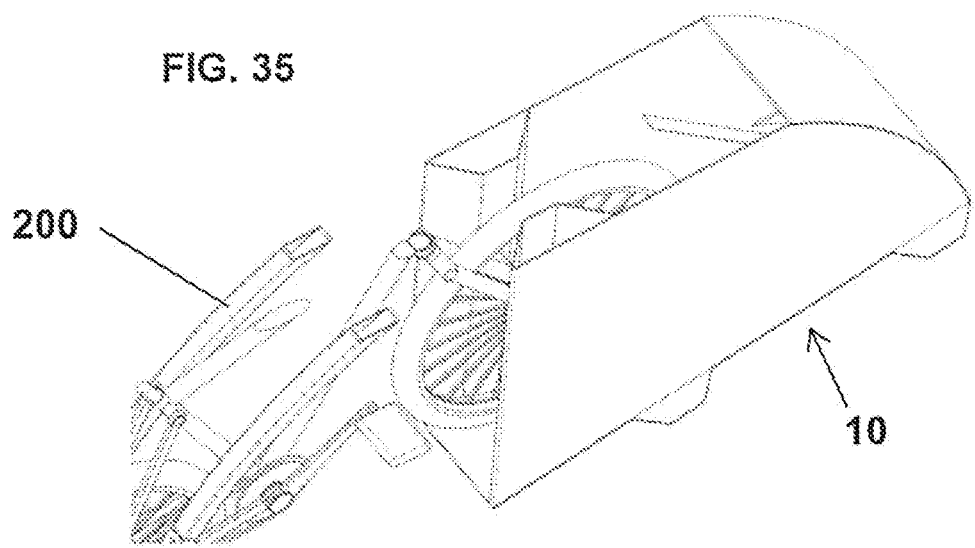
FIG. 35 is a fragmentary perspective sectional view of the station of FIG. 1 showing a bike locked in the station taken along the line II-II of FIG. 10.

FIG. 35 is a perspective sectional view of the station 10 of FIG. 1 showing a bike 200 locked in the station 10.

Figure 36:
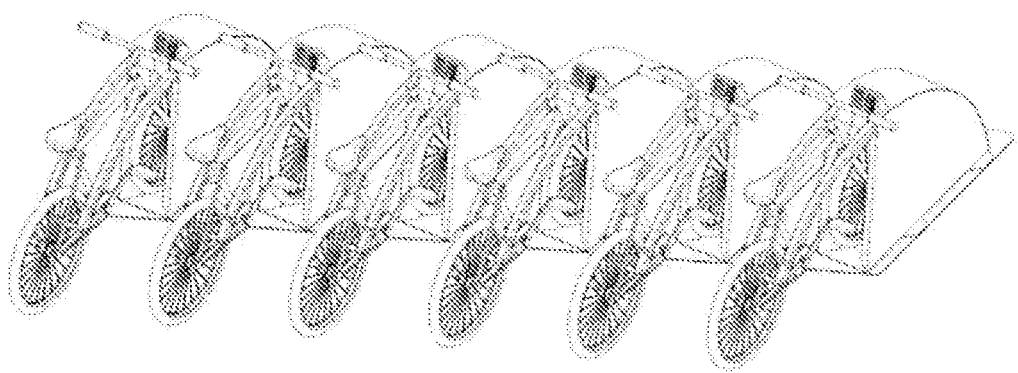
FIG. 36 is a perspective view of a plurality of bike stations of the present invention arranged in a first modular pattern.
Figure 37:
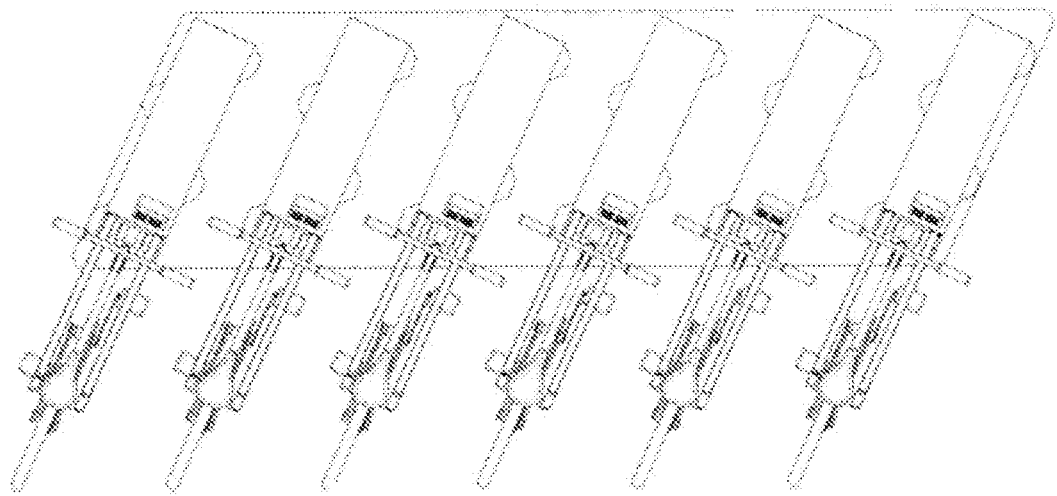
FIG. 37 is a plan view of the bike stations of FIG. 36.

FIG. 36 is a perspective view of a plurality of bike stations 10 of the present invention arranged in a first modular pattern. Since the individual stations are modular in nature, any assembly and orientation of station arrangements can be designed FIG. 37 is a plan view of the bike stations 10 of FIG. 36.

Figure 38:
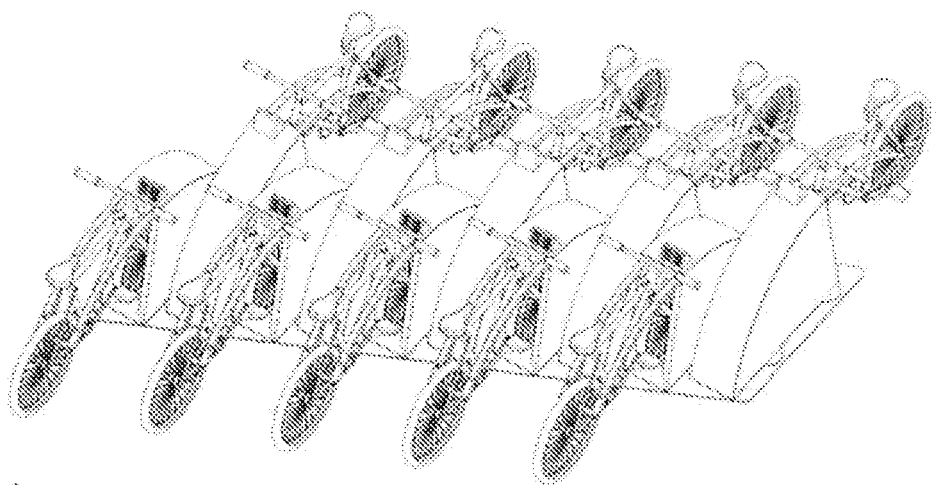
FIG. 38 is a perspective view of a plurality of bike stations of the present invention arranged in a second modular pattern.

FIG. 38 is a perspective view of a plurality of bike stations 10 of the present invention arranged in a second modular pattern. The stations are nested together to minimize the overall footprint.

Figure 39:
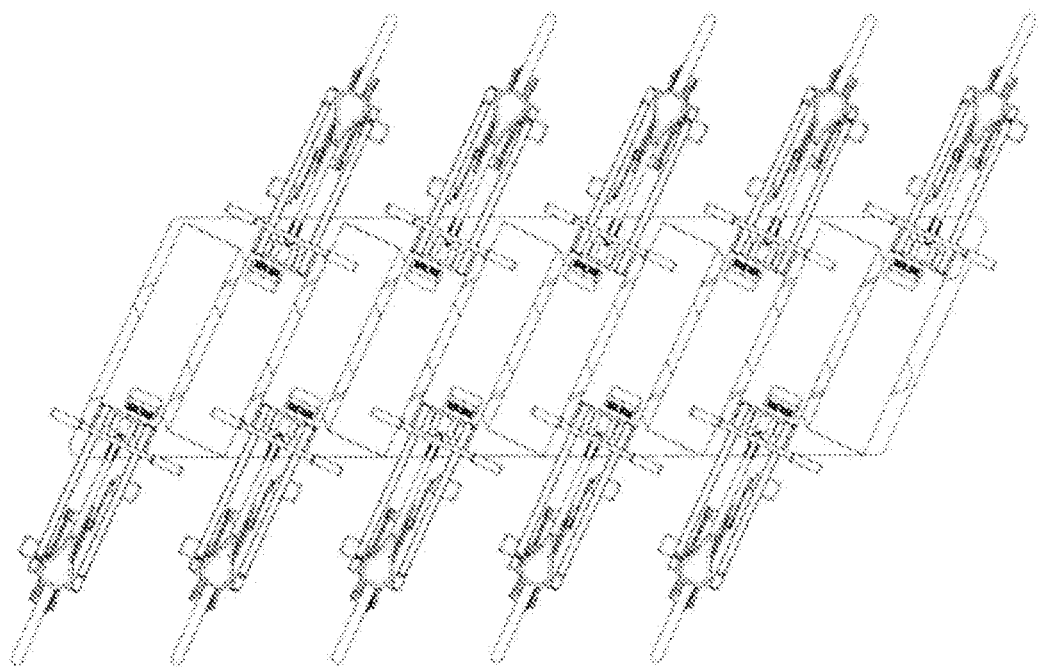
FIG. 39 is a plan view of the bike stations of FIG. 38.

FIG. 39 is a plan view of the bike stations 10 of FIG. 38.

Figure 40:
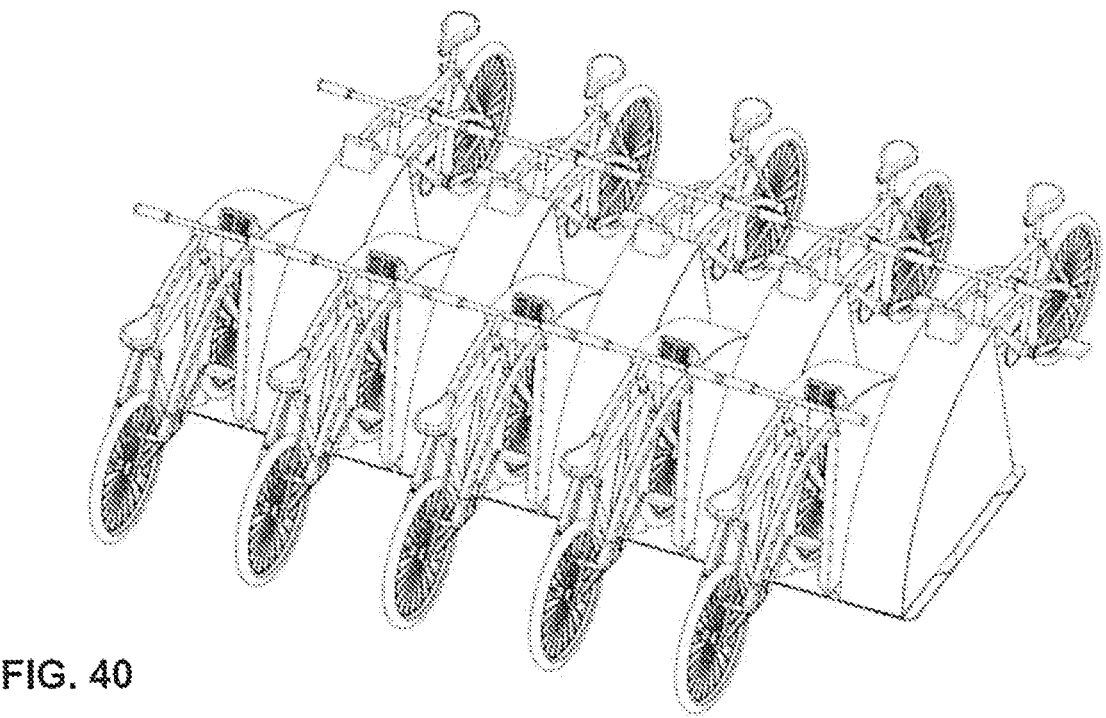
FIG. 40 is a perspective view of a plurality of bike stations of the present invention arranged in a third modular pattern.

FIG. 40 is a perspective view of a plurality of bike stations 10 of the present invention arranged in a third modular pattern.

Figure 41:
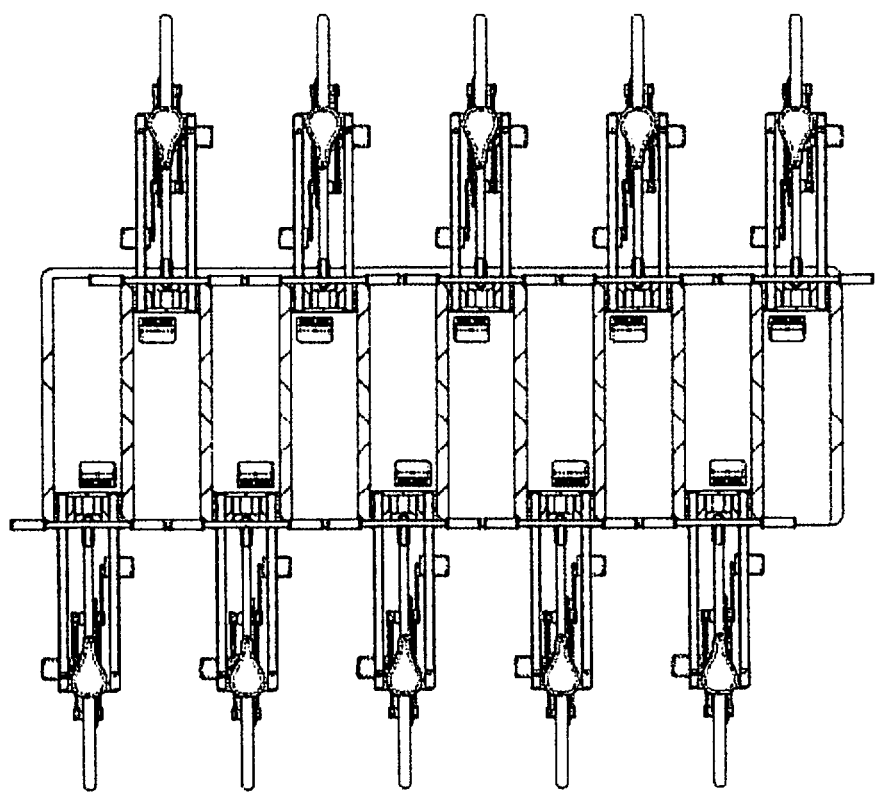
FIG. 41 is a plan view of the bike stations of FIG. 40.

FIG. 41 is a plan view of the bike stations 10 of FIG. 40.

Figure 42:
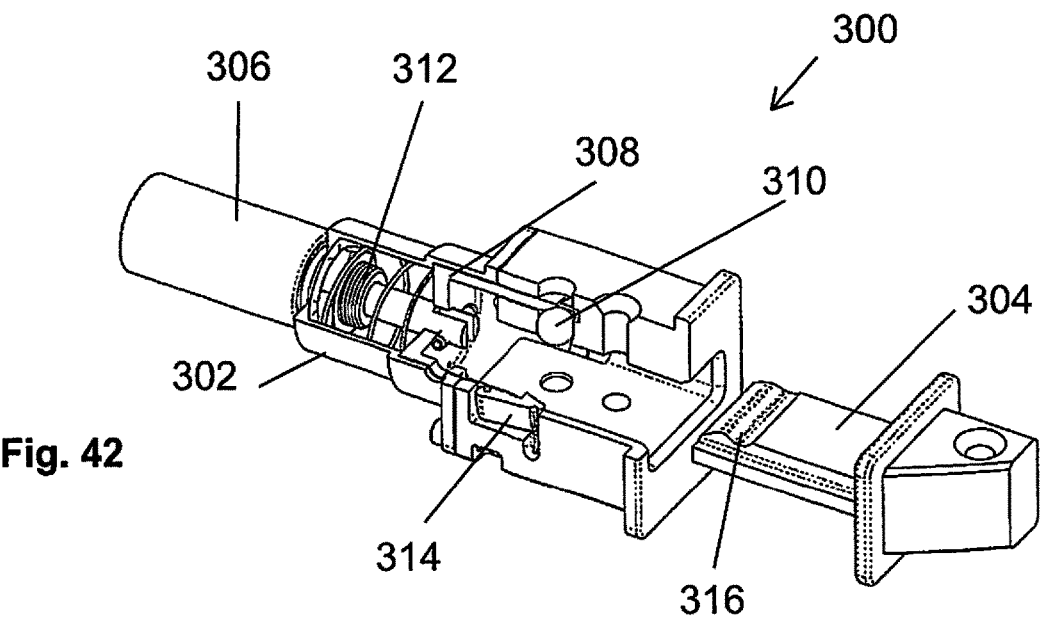
FIG. 42 is a fragmentary perspective view of a second, presently preferred embodiment of a lock including a locking mechanism and lock tongue according to the present invention showing the lock in an unlocked state.
Figure 43:
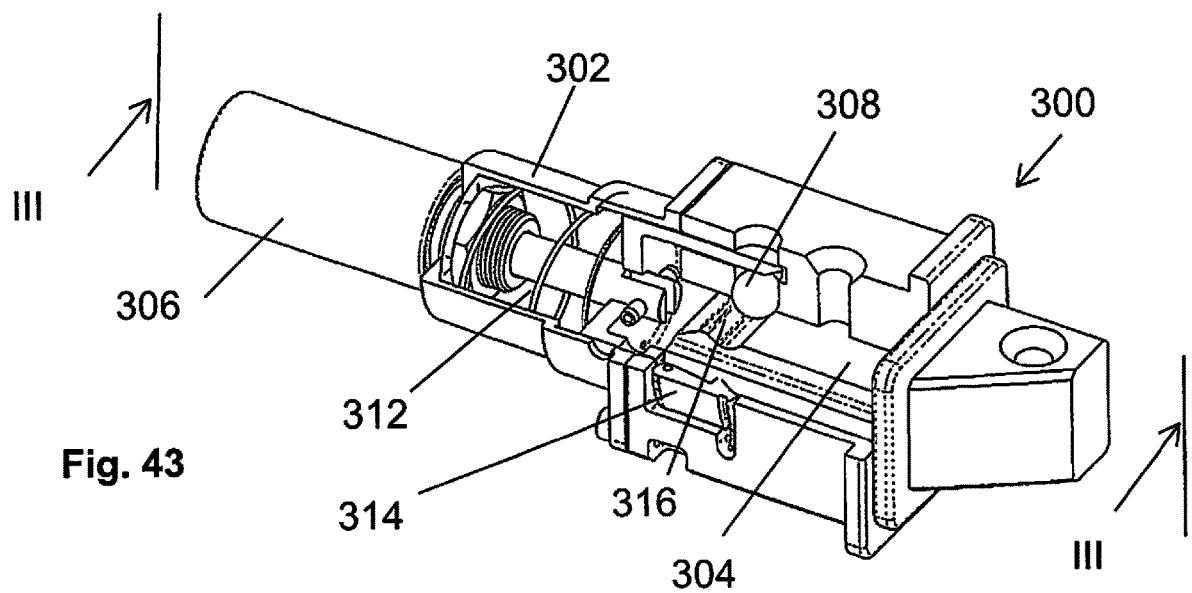
FIG. 43 is a fragmentary perspective view of the lock of FIG. 42 showing the lock in a locked state with the locking mechanism engaging a lock tongue.
Figure 44:
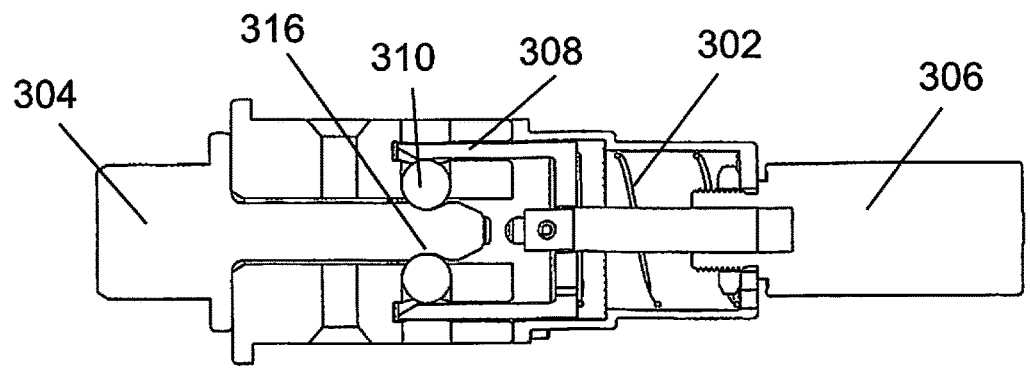
FIG. 44 is a side elevational sectional view of the lock of FIG. 43 taken along the line III-III of FIG. 43.
Figure 45:
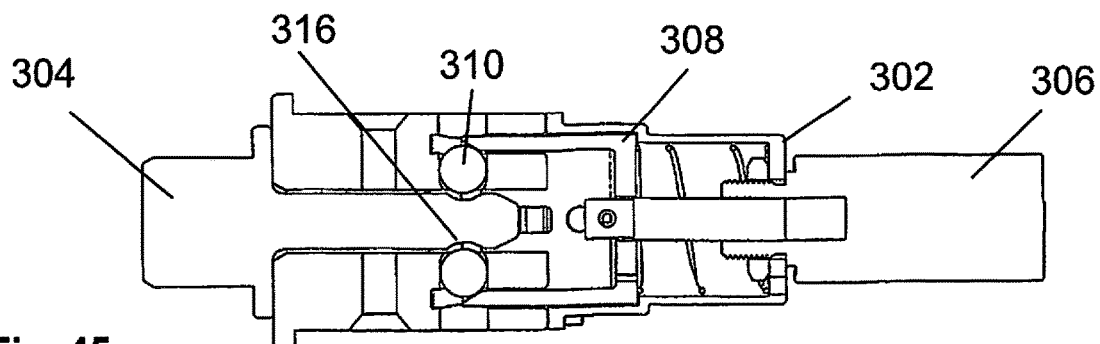
FIG. 45 is a side elevational sectional view of the lock of FIG. 44 shown with the lock being disengaged from the lock tongue to permit the lock tongue to be withdrawn from the locking mechanism.
Figure 46:
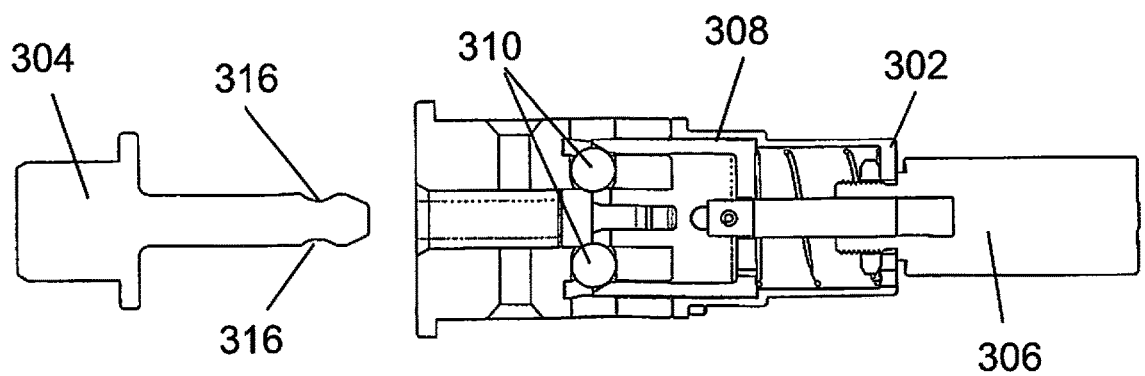
FIG. 46 is a side elevational view of the lock of FIG. 45 with the lock tongue having been withdrawn from the locking mechanism.

FIG. 42 is a fragmentary perspective view of a presently preferred embodiment of a lock 300 including a locking mechanism 302 and lock tongue 304 according to the present invention showing the lock 300 in an unlocked state. The locking mechanism 302 is installed in the outer end 60 of the left arm 54 of the lock bar assembly 50 (not shown) while the lock tongue 304 is secured in and to the free end of the latch 70. The lock 300 is an alternative to the embodiment employing a latch loop pin 76, push button latch release 72 et. al. described above. The locking mechanism 300 includes a solenoid 306 which is remotely activated to release the lock tongue 304 from the locking mechanism 302. The locking mechanism 302 also includes a lock cage 308, lock bearings 310, a lock spring 312 and a lock pawl 314. The lock spring 312 urges the lock cage 308 forward away from the solenoid 306 until the forward edge of the lock cage 308 is captured by the lock pawl 314. The lock cage 308 moves in a rearward direction from a first position to a second position against the force of the lock spring 312 when the solenoid 306 is activated. In operation, when the lock tongue 304 is inserted in the locking mechanism 302, the lock tongue 304 pushes back the lock pawl 314 to release the lock cage 308 which is urged forward by lock spring 312. The lock cage 308 in turn urges the lock bearings 310 against the lock tongue 304 which includes lock tongue grooves 316 on the upper and lower surfaces of the generally planar lock tongue 304 for receiving the lock bearings 310 thereby engaging and securing the lock tongue 304 in the lock mechanism 302 (FIGS. 43 and 44) in a locked state. To unlock, the solenoid 306 is activated such that the lock cage 308 is pulled backward against the force of the lock spring 312, thereby releasing the lock bearing 310 (FIG. 45) and thus permitting the lock tongue 304 to be withdrawn from the lock mechanism 302 (FIG. 46) Various modifications can be made in the details of the various embodiments of the articles of the present invention, all within the scope and spirit of the invention as defined by the appended claims.

The invention claimed is:

1. An integrated rack and lock station for a bicycle, the station comprising:
   a front wheel well having an interior and adapted to receive and enclose at least a portion of the front wheel of the bicycle,
   a lock bar assembly moveably attached to the front wheel well, the lock bar assembly moveable from a first position to a second position, the lock bar assembly extending substantially within the front wheel well in the first position, and substantially over the bicycle in the second position; and
   means for securing the bicycle to the lock bar assembly;
   wherein the lock bar assembly includes a pair of generally parallel arms;
   wherein each of the arms having a first end and a second end, the second end of each of the arms protruding from the front wheel well member when the lock bar assembly is in the second position; and
   wherein the lock bar assembly further includes a latch, the latch being moveable from a first unlatched position to at least one second latched position, the latch extending from the second end of one of the arms, the latch being extendable through the rear wheel of the bicycle when the lock bar assembly is in the second position.

2. The integrated rack and lock station of claim 1, further including at least one guide roller attached to the front wheel well, the at least one guide roller supporting the lock bar assembly.

3. The integrated rack and lock station of claim 2, further including at least two guide rollers attached to the front wheel well, the at least two guide rollers guiding the motion of the lock bar assembly as the lock bar assembly is moved between the first position and the second position.

4. The integrated rack and lock station of claim 1, further including a generally arc-shaped ratchet rack secured to the interior of the front wheel well, the ratchet rack being generally parallel to and spaced from one of the arms of the lock bar assembly.

5. The integrated rack and lock station of claim 4, further including a releasable ratchet catch pivotably mounted on the first end of the first arm or the second arm of the lock bar assembly and adapted for engagement with the ratchet rack, such that engagement of the ratchet catch with the ratchet rack prevents motion of the lock bar assembly in a first direction from the first position to the second position but not in a second direction from the second position to the first position.

6. The integrated rack and lock station of claim 5 further including a spring for urging the lock bar assembly from the at least one second position to the first position.

7. The integrated rack and lock station of claim 6 wherein the first arm and the second arm are tubular, and further including a cable extending within one of the tubular first and second arms between the ratchet catch and the latch, the cable being adapted to release the ratchet catch from the ratchet rack in the open position.

8. The integrated rack and lock station of claim 1, wherein the latch is biased to close when in an open position.

9. The integrated rack and lock station assembly of claim 1 wherein the latch is locked in the latched position, by a releasable locking device.

10. The integrated rack and lock station assembly of claim 9 wherein the locking device is adapted to be manually released.

11. The integrated rack and lock station assembly of claim 10 wherein the locking device is provided with a locked state in which the locking device cannot be manually released, and an unlocked state in which the locking device can be manually released.

12. The integrated rack and lock station assembly of claim 11 wherein the state of the locking device can be changed remotely.

13. The integrated rack and lock station of claim 12 wherein the means for remotely controlling the state of the locking device are electrical.

14. The integrated rack and lock station of claim 1, wherein the lock bar assembly is arc-shaped.

15. The integrated rack and lock station of claim 11 further comprising an electromechanical release of the locking device, wherein a cable run in either the first arm or second arm of the lock bar assembly arm will override the electromechanical release of the lock device for a manual release of the locking device.

* * * * *

UNITED STATES PATENT AND TRADEMARK OFFICE
CERTIFICATE OF CORRECTION

| | | |
|---|---|---|
| PATENT NO. | : 10,843,752 B2 | Page 1 of 1 |
| APPLICATION NO. | : 16/355957 | |
| DATED | : November 24, 2020 | |
| INVENTOR(S) | : Sawhill et al. | |

It is certified that error appears in the above-identified patent and that said Letters Patent is hereby corrected as shown below:

In the Claims

Column 12, Line 17, Claim 15, change "assembly arm will" to -- assembly will --

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*